A. J. INNES.
MOVING STAIRWAY OR CONVEYER.
APPLICATION FILED APR. 13, 1915.
1,148,901.
Patented Aug. 3, 1915.
2 SHEETS—SHEET 1.
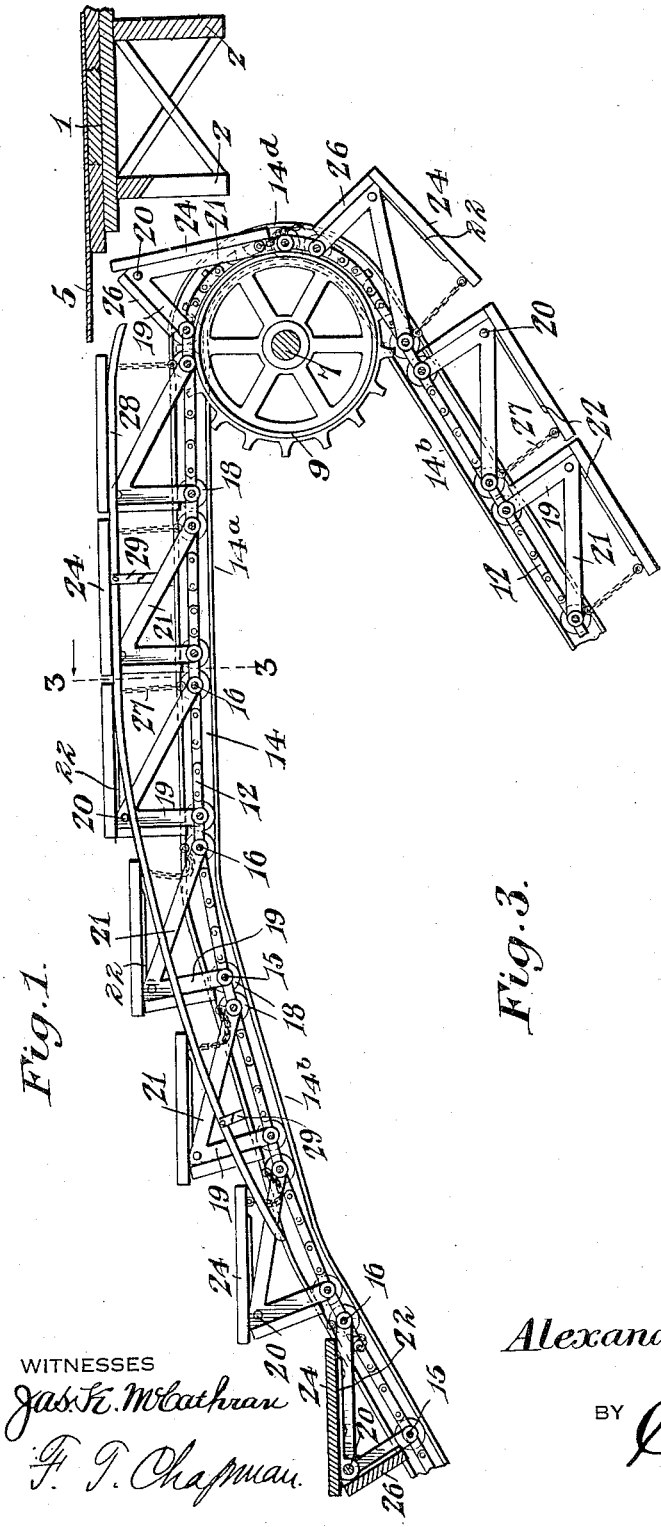
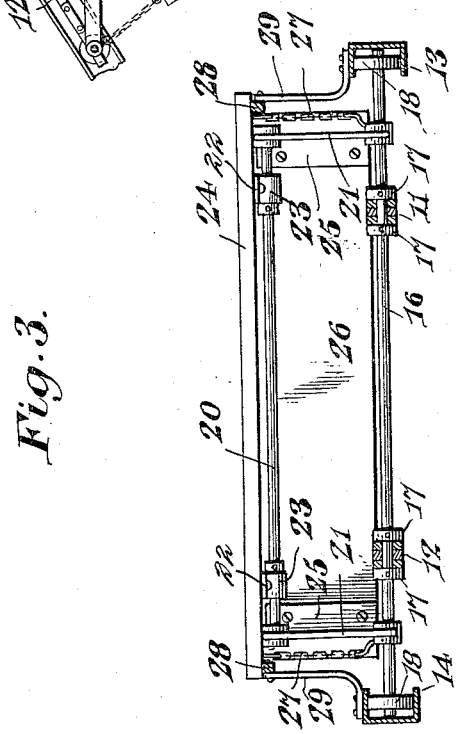
Alexander J. Innes, INVENTOR

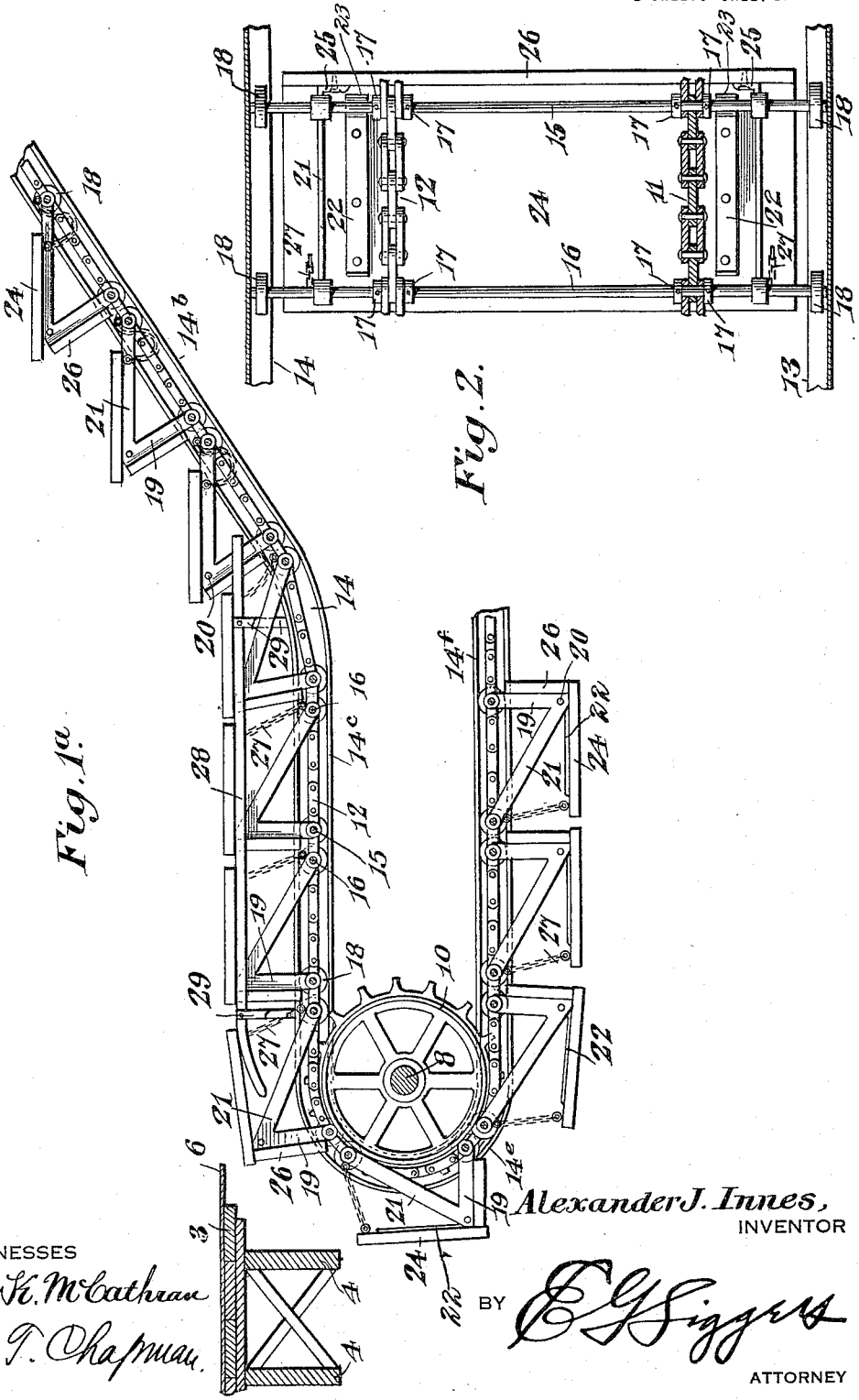

UNITED STATES PATENT OFFICE.

ALEXANDER J. INNES, OF SUTHERLAND, IOWA.

MOVING STAIRWAY OR CONVEYER.

1,148,901.   Specification of Letters Patent.   Patented Aug. 3, 1915.

Application filed April 13, 1915. Serial No. 21,079.

*To all whom it may concern:*

Be it known that I, ALEXANDER J. INNES, a citizen of the United States, residing at Sutherland, in the county of O'Brien and State of Iowa, have invented a new and useful Moving Stairway or Conveyer, of which the following is a specification.

This invention has reference to moving stairways and while to facilitate description the invention will be termed a moving stairway, the structures employed are useful for other conveying purposes, such as carrying goods of various kinds from one floor to another either up or down.

The object of the invention is to provide a moving stairway or other conveying structure wherein the tread is hinged so as to readily accommodate itself to changing relations of its supporting parts, so that changes of direction, especially between the upper and lower runs are made without waste of space.

In accordance with the present invention each tread is hinged at its front end to a supporting member to which the riser when employed is made fast and that end of the supporting member to which the tread is hinged is in turn connected to other members. The other ends of both the tread supporting members and the members to which said tread supporting members are connected are both connected to an endless flexible member, such as a sprocket chain, or in the practical embodiment of the invention to two laterally spaced sprocket chains moving over sprocket wheels at the top and bottom of the stairway. The chains as well as the members provided for carrying the treads are connected to transverse bars or rods each of which at the ends carries rollers, and these rollers are caused to travel along tracks in the form of channel bars preventing any rise and fall of the rollers except as demanded by the direction of the channel bars.

On each side of the moving stairway there are the endless tracks formed of channel bars and constituting the guides for the rollers, said tracks conforming in general to the contour of the stairway as to both the upper and lower runs thereof. The arrangement is such that all the utilized treads remain level while those treads approaching the utilized position or leaving the utilized position leave the level condition, especially on traveling about the sprocket wheels, at which places the channel tracks are concentric with the axis of rotation of the sprocket wheels. The hinged treads permit an approach of those ends of the treads remote 30 from the hinges to the tracks in such manner that the overhangs at the receiving and exit ends of the stairway may be close to supporting timbers, such as floor joists, thus contributing to the strength of the structure and also in a large measure avoiding liability of accident.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a longitudinal section taken close to one of the channel tracks so as to show the treads and their supports in elevation, Fig. 1 being confined to the upper end of the stairway. Fig. 1ª is a similar view of the lower end of the stairway. Fig. 2 is a bottom plan view with some parts in longitudinal section of one of the stairway elements with the propelling chain and the supporting tracks. Fig. 3 is a section on the line 3—3 of Fig. 1, distant parts being omitted and the figure being shown on a larger scale than Fig. 1.

Referring to the drawings there is shown in Fig. 1 an upper floor 1 together with supporting joists 2 therefor, and in Fig. 1ª a lower floor 3 with supporting joists 4, is indicated. The floor 1 is provided with an approach plate 5 and the floor 3 is provided with an approach plate 6 for the stairway.

Beneath the level of the floor 1 there is a shaft 7 which may be considered as properly supported, and beneath the level of the floor 3 is another shaft 8 which may also be considered as properly supported. Either one of the shafts 7 and 8 may be utilized as a drive shaft.

Mounted on the shaft 7 are sprocket wheels 9, and mounted on the shaft 8 are sprocket wheels 10, and extending over these sprocket wheels are chains 11, 12, respectively, these chains being endless, and each of a length to follow a certain course. Because of the path which the stairway must take the sprocket chains may be considerably longer than the shortest distance between the two sprocket wheels.

Following the course of travel of the stairway and arranged on opposite sides of the center line of the stairway in suitably spaced relation are tracks 13, 14, each formed of channel metal with the connecting web of the channel upright, so that the edge webs are horizontal or approximately so. Each track 13 and 14 adjacent to the upper floor 1 is approximately level for a suitable distance and is located at a suitable distance below the level of the floor 1. This level portion is indicated at $14^a$ in Fig. 1, and while the track 13 is not shown in Fig. 1 it will be understood that it has a like level portion. From the level portion $14^a$ the track 14 slants downwardly, such downward slant being indicated at $14^b$, and adjacent to the lower floor 3 the track 14 has another level portion $14^c$ also lower than the floor 3. Where the track 14 is adjacent to the sprocket wheels 7 and 8 it has respective curved portions $14^d$ and $14^e$ concentric with the axis of rotation of the sprocket wheels, and these curved portions $14^d$ and $14^e$ are joined by a return portion of the track indicated at $14^f$.

At suitable intervals the chains 11, 12 are joined by transverse rods 15, 16, the rods taking the place of certain ones of the pivots connecting the links of the chains. The chains are spaced on the rods 15, 16 by set collars 17, or in any other appropriate manner. The rods 15, 16, extend for some distance beyond the outer sides of the chains 11, 12, and enter the channels of the respective tracks 13 and 14 where the rods carry rollers 18 adapted to the channel tracks, so as to travel therealong without undue lost motion. Each rod 15 between the respective chains 11 and 12 and the rollers 18 has normally upright links 19 mounted thereon, the rod 15 traversing one end of each link and each link being mounted at the other end on a pivot rod 20 in substantially parallelism with the rod 15.

Mounted at one end on the rod 20 adjacent to the links 19 are other links 21 which at their other ends are pivoted to the rods 16 between the respective chains 11 and 12 and the respective tracks 13 and 14. Also pivoted to the rods 20 are straps 22 each terminating in an eye 23 traversed by the rod 20. The straps 22 carry a tread 24 there being such a tread for each pair of rods 15 and 16. The uprights 19 are each formed with an angle web 25 to which is attached the respective portions of a riser 26, there being such a riser for each tread 24, especially when the device is utilized as a stairway. The risers, however, are not directly attached to the treads and the latter are capable of movement independently of the risers about the rod 20 as a pivot. Moreover, the end of each tread remote from its pivot connection to the rod 20 has flexible connections 27 with the rod 16, or with the links 21 where carried by the rod 16. Such flexible connection may be a chain or be any other structure which will serve to support the free end of the tread, especially while in a position corresponding to the lower or return run of the stairway. The chains 27 prevent the treads from dropping beyond a certain limited extent when the steps are in pendent relation to the chain, as shown at the right hand portion of Fig. 1 and the left hand portion of Fig. $1^a$.

From a point beneath the overhang 5 to a point at an appropriate distance along the inclined portion $14^b$ of the track 14 and in corresponding relation to the track 13 are guide and supporting bars 28 which may be mounted upon the respective tracks and supported at an appropriate distance thereabove by suitably placed posts 29, or these guide bars 28 may be otherwise supported. The purpose of the bars 28 and of other similar bars 29 close to the overhang 6 of the floor 3 is to uphold the treads 24 along the level portions of the tracks 13 and 14 where the treads have no other support. However, on the inclined portion $14^b$ the rollers 18 carried by the rods 16 are at a sufficient elevation with respect to the rollers 18 carried by the rods 15 to bring the links 21 substantially level, and then such links support the treads in a substantially level condition. By this means a person stepping on a traveling tread from the floor 3 when the stairway is an ascending stairway, or upon the tread 24 adjacent to the floor 1 when the stairway is a descending stairway, is supported by a lever tread, and the tread remains level despite the inclination or declination of the stairway. On approaching the landing or discharge end of the stairway the treads for an appropriate distance are all on one level, and the traveler being transported by the stairway is enabled to step therefrom without difficulty. When the steps move about the sprocket wheels in the change of course from the lower run to the upper run, or from the upper run to the lower run as the case may be, the treads where their hinged ends are uppermost assume a pendent position and where their hinged ends are lower than the free ends the treads can only move away from the sprocket chains to the extent permitted by the limiting chains 27.

The links 19 and 21 carrying a tread 24 may be in fixed relation one to the other where they carry the rod 20, so that the two links constituting two sides of a triangular frame, the other side of which is made up of a corresponding portion of the chain 11 or 12, as the case may be. Each tread 24 is therefore carried by and near one edge pivoted to the apex portion of a substantially triangular supporting frame with the other side of the frame composed of flexible members consisting in the particular instance shown of the chains 11 and 12 and at each end of the chain section constituting such side of the triangular frame are supporting rollers adapted to the spaced tracks along which the rollers travel. The triangular frame supports for the treads are so related to the latter that the longer sides of the triangles, which are approximately right-angular triangles, constitute supports for the treads when the latter are moving up or down the inclined portion of the stairway reaching from one floor to another higher or lower floor as the case may be. The transition from treads located at about a floor level to the inclined portion is made gradually and throughout such length of travel the treads have other supports than the longer sides of the triangular supporting frames, these supports consisting of the bars 28 and 29.

As already intimated the present invention has a wider usefulness than that of a moving stairway, since the structure is quite capable of use for elevating or lowering different kinds of goods after the manner of a conveyer. When used as a stairway, guards, balusters, or the like, such as are provided for moving stairways, may be employed. When the device is used as a conveyer for goods, such guards or balusters may be omitted.

What is claimed is:—

1. A moving stairway having spaced tracks, an endless series of substantially triangular supporting frames with endless flexible members constituting the basic sides of the frames, and treads each pivotally connected near one edge to the apex portion of a respective frame.

2. A moving stairway having spaced tracks, an endless series of substantially triangular supporting frames with endless flexible members constituting the basic sides of the frames, and treads each pivotally connected near one edge to the apex portion of a respective frame, the track being also provided with supports in position to be engaged by the treads during the transition stage between a floor level and the inclined portion of a stairway.

3. A traveling stairway or the like comprising endless tracks spaced apart, endless sprocket chains, supporting and driving means for the chains at the end portions of the stairway, substantially triangular frames having the endless chains constituting the basic portion thereof and each frame being provided at the ends of the basic portion with rollers adapted to the respective tracks, and treads each hinged to the apex portion of a respective triangular frame near one long edge of the tread.

4. A traveling stairway or the like comprising endless tracks spaced apart, endless sprocket chains, supporting and driving means for the chains at the end portions of the stairway, substantially triangular frames having the endless chains constituting the basic portion thereof and each frame being provided at the ends of the basic portion with rollers adapted to the respective tracks, and treads each hinged to the apex portion of a respective triangular frame near one long edge of the tread, the stairway being also provided with tread supporting bars adjacent to each floor level for supporting the treads during the transition from a floor level to a lower or higher portion of the stairway.

5. A traveling stairway or the like comprising endless tracks spaced apart, endless sprocket chains, supporting and driving means for the chains at the end portions of the stairway, substantially triangular frames having the endless chains constituting the basic portion thereof and each frame being provided at the ends of the basic portion with rollers adapted to the respective tracks, and treads each hinged to the apex portion of a respective triangular frame near one long edge of the tread, the stairway being also provided with tread supporting bars adjacent to each floor level for supporting the treads during the transition from a floor level to a lower or higher portion of the stairway, and each tread having at the edge remote from the hinged edge a flexible connection to the supporting frame for limiting the drop of the tread on traversing the lower run of the stairway.

6. A traveling stairway comprising endless channel tracks spaced apart in correspondence with the width of the stairway, endless chains having a path of travel substantially that of the contour of the tracks, substantially triangular frames provided with rollers at the ends adapted to the tracks and connected to the chains with the latter constituting the basic portion of each triangular frame, and a tread for each frame hinged thereto at its apex portion near one long edge of the tread.

7. A traveling stairway comprising endless channel tracks spaced apart in correspondence with the width of the stirway, endless chains having a path of travel substantially that of the contour of the tracks, substantially triangular frames provided with rollers at the ends adapted to the tracks and connected to the chains with the latter constituting the basic portion of each triangular frame, and a tread for each frame hinged thereto at its apex portion near one long edge of the tread, and said tread having flexible connections between its other long edge and a portion of its triangular frame.

8. A traveling stairway comprising endless channel tracks spaced apart in correspondence with the width of the stairway, endless chains having a path of travel substantially that of the contour of the tracks, substantially triangular frames provided with rollers at the ends adapted to the tracks and connected to the chains with the latter constituting the basic portion of each triangular frame, and a tread for each frame hinged thereto at its apex portion near one long edge of the tread, and said tread having flexible connections between its other long edge and a portion of its triangular frame, and each triangular frame also having a riser fast thereto.

9. A traveling stairway comprising endless channel tracks spaced apart in correspondence with the width of the stairway, endless chains having a path of travel substantially that of the contour of the tracks, substantially triangular frames provided with rollers at the ends adapted to the tracks and connected to the chains with the latter constituting the basic portion of each triangular frame, and a tread for each frame hinged thereto at its apex portion near one long edge of the tread, and said tread having flexible connections between its other long edge and a portion of its triangular frame, and each triangular frame also having a riser fast thereto, and the stairway being provided with extended supporting bars for the treads along the transition portion of the stairway where the treads move from a floor level on to the inclined portion, or vice versa.

10. A traveling stairway provided with a series of treads and a traveling series of supports for the treads with each tread hinged at one long edge to a respective support and the latter being related to the inclination of the stairway to support the respective tread in a substantially level condition while moving along the inclined portion of the stairway.

11. A traveling stairway provided with a series of treads and a traveling series of supports for the treads with each tread hinged at one long edge to a respective support and the latter being related to the inclination of the stairway to support the respective tread in a substantially level condition while moving along the inclined portion of the stairway, and said stairway at the terminal portion of the different levels being provided with other supports for the treads and the treads and first-named supports having a range of movement toward and from each other to permit a movement of the treads away from the first-named supports on engagement with the second-named supports.

12. A traveling stairway provided with a series of treads and a traveling series of supports for the treads with each tread hinged at one long edge to a respective support and the latter being related to the inclination of the stairway to support the respective tread in a substantially level condition while moving along the inclined portion of the stairway and said stairway at the terminal portions of the different levels being provided with other supports for the treads and the treads and first-named supports having a range of movement toward and from each other to permit a movement of the treads away from the first-named supports on engagement with the second-named supports, the stairway being further provided with endless tracks for carrying the first-named supports and the treads thereon and with endless propelling members for causing progressive movements of the treads and their supports.

In testimony, that I claim the foregoing as my own, I have hereto affixed my signature in the presence of two witnesses.

ALEXANDER J. INNES.

Witnesses:
C. A. WATTS,
T. B. BARK.

Copies of this patent may be obtained for five cents each, by addressing the "Commissioner of Patents, Washington, D. C."